(12) United States Patent
Liu et al.

(10) Patent No.: US 9,714,341 B2
(45) Date of Patent: Jul. 25, 2017

(54) BIODEGRADABLE POLYESTER-BASED BLENDS

(71) Applicant: WASHINGTON STATE UNIVERSITY, Pullman, WA (US)

(72) Inventors: Hongzhi Liu, Pullman, WA (US); Jinwen Zhang, Pullman, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 14/778,436

(22) PCT Filed: Mar. 18, 2013

(86) PCT No.: PCT/US2013/032796
§ 371 (c)(1),
(2) Date: Sep. 18, 2015

(87) PCT Pub. No.: WO2014/149024
PCT Pub. Date: Sep. 25, 2014

(65) Prior Publication Data
US 2016/0053112 A1    Feb. 25, 2016

(51) Int. Cl.
C08L 67/04 (2006.01)
C08L 67/00 (2006.01)
C08L 101/16 (2006.01)

(52) U.S. Cl.
CPC ............... *C08L 67/04* (2013.01); *C08L 67/00* (2013.01); *C08L 101/16* (2013.01)

(58) Field of Classification Search
None
See application file for complete search history.

(56) References Cited

U.S. PATENT DOCUMENTS

| | | | |
|---|---|---|---|
| 2004/0192859 A1 | 9/2004 | Parker et al. | |
| 2004/0242803 A1 | 12/2004 | Ohme et al. | |
| 2005/0080223 A1 | 4/2005 | Tuominen et al. | |
| 2006/0263394 A1* | 11/2006 | Oyama | C08L 51/006 424/400 |
| 2008/0027178 A1* | 1/2008 | Uradnisheck | C08L 67/04 525/190 |
| 2009/0047256 A1 | 2/2009 | Bettinger et al. | |
| 2009/0286060 A1 | 11/2009 | Sala et al. | |
| 2012/0316923 A1 | 12/2012 | Rafei et al. | |

FOREIGN PATENT DOCUMENTS

JP         S59155423 A         9/1984

OTHER PUBLICATIONS

International Search Report and Written Opinion for international Application No. PCT/US13/32796 mailed on Jun. 10, 2013.
Liu et al., Effects of Metal Ion type on Impact Toughness of Ionomer Assisted Reactively compounded PLA Ternary Blends, *Industrial & Engineering Chemistry Research* Mar. 2013), 52(13):4787-4793.
Liu et al., Effects of reactive blending temperature on impact toughness of poly(lactic acid) ternary blends, *Polymer* (Dec. 22, 2011), 53(2):272-276.
Liu et al., Interaction of Microstructure and Interfacial Adhesion on Impact Performance of Polylactide (PLA) Ternary Blends, *Macromolecules* (Feb. 16, 2011), 44(6):1513-1522.
Liu et al., Super Toughened Poly(lactic acid) Ternary Blends by Simultaneous Dynamic Vulcanization and Interfacial Compatibilization, *Macromolecules* (Jun. 30, 2010), 43(14):6058-6066.
Song et al., Effects of ionomer characteristics on reactions and properties of poly(lactic acid) ternary blends prepared by reactive blending, *Polymer* (May 25, 2012), 53(12):2476-2484.

* cited by examiner

*Primary Examiner* — Ana Woodward
(74) *Attorney, Agent, or Firm* — Pepper Hamilton LLP (57) ABSTRACT

Compositions of biodegradable polymer blends and methods for making these polymers are disclosed. A polymer blend may have a composition of at least one biodegradable polyester present in about 50 weight percent to about 90 weight percent of the polymer composition, at least one biodegradable elastomer with cross-linked epoxy functional groups, and at least one catalytic curing agent. The at least one biodegradable elastomer and the at least one catalytic curing agent can be present in a total amount of about 10 weight percent to about 50 weight percent of the polymer composition, and can be present in a weight-to-weight ratio of about 19:1 to about 1:1. Further, the polymer may have a notched Izod impact strength according to ASTM D256 of about 150 Joules/meter to about 1200 Joules/meter.

21 Claims, 2 Drawing Sheets

BIODEGRADABLE POLYESTER-BASED BLENDS

CROSS-REFERENCE TO RELATED APPLICATIONS

This application is a U.S. national stage filing under 35 U.S.C. §371 of International Application No. PCT/US2013/032796 filed on Mar. 18, 2013 entitled "BIODEGRADABLE POLYESTER-BASED BLENDS," which is incorporated herein by reference in its entirety.

BACKGROUND

The use of polymers for various disposable articles is widespread and well known in the art. In fact, the heaviest use of polymers in the form of films and fibers occurs in the packaging and the disposable article industries. Films employed in the packaging industry include those used in food and non-food packaging, merchandise bags and trash bags. However, these non-degradable petroleum-based thermoplastics contribute to enormous environmental issues.

Biodegradable polymers with excellent strength and stiffness are considered to be promising alternatives to replace some of the thermoplastics. However, the brittleness of some of these biodegradable polymers is a major drawback, impeding its widespread use. In addition, biodegradable polymers do not contain functional groups, such as carboxylic acid groups, hydroxyl groups and amine groups, except at the polymer chain ends. This lack of functional groups greatly limits the application of these synthetic biodegradable polymers.

Incorporating flexible polymers or elastomers via melt blending may be a potentially cost effective way of overcoming the brittleness of biodegradable polymers. Various non-biodegradable polymers such as polyethylene (PE), polyethylene terephthalate (PET), poly(ether)urethane, acrylonitrilebutadiene-styrene copolymer, thermoplastic polyolefin elastomers, poly(ethylene-glycidyl methacrylate) (EGMA), linear low-density polyethylene and many other petroleum-based polymers and elastomers have been used in toughening the biodegradable polymers. Although many of the reported polymer blends show impressively high tensile elongations compared with that of neat biodegradable polymer, only marginal to moderate improvements in impact strength (IS) have been achieved. Further, the presence of non-biodegradable elastomers in these polymer blends still has an environmental impact. Thus, it is derisible to develop polymer blends with biodegradable components that display better impact strength and tensile properties.

SUMMARY

The present disclosure is directed to compositions and methods of making biodegradable polymer blends with good impact strength and tensile properties. In one embodiment, a polymer composition may include at least one biodegradable polyester present in about 50 weight percent to about 90 weight percent of the polymer composition, at least one biodegradable elastomer with cross-linked epoxy functional groups, and at least one catalytic curing agent. The at least one biodegradable elastomer and the at least one catalytic curing agent are present in a total amount of about 10 weight percent to about 50 weight percent of the polymer composition and are present in a weight to weight ratio of about 19:1 to about 1:1.

In another embodiment, a biodegradable polymer blend composition may include at least one biodegradable polyester present in about 50 weight percent to about 90 weight percent of the polymer composition, at least one biodegradable elastomer with cross-linked epoxy functional groups, and at least one catalytic curing agent, wherein the at least one biodegradable elastomer and the at least one catalytic curing agent are present in a total amount of about 10 weight percent to about 50 weight percent of the polymer composition, and are present in a weight-to-weight ratio of about 19:1 to about 1:1. Further, the biodegradable polymer blends may have a notched Izod impact strength according to ASTM D256 of about 150 Joules/meter to about 1200 Joules/meter, a tensile strength of about 35 MPa to about 50 MPa, and an average particle diameter of about 0.5 microns to about 2 microns.

In an additional embodiment, a method of making a biodegradable polymer blend may involve melt blending a mixture of at least one biodegradable polyester present in about 50 weight percent to about 90 weight percent of the polymer composition, at least one biodegradable elastomer with cross-linked epoxy functional groups, and at least one catalytic curing, wherein the at least one biodegradable elastomer and the at least one catalytic curing agent are present in a total amount of about 10 weight percent to about 50 weight percent of the polymer composition, and are present in a weight-to-weight ratio of about 19:1 to about 1:1.

In a further embodiment, a biodegradable polymer article may be made from a polymer blend composition of at least one biodegradable polyester present in about 50 weight percent to about 90 weight percent of the polymer composition, at least one biodegradable elastomer with cross-linked epoxy functional groups, and at least one catalytic curing agent, wherein the at least one biodegradable elastomer and the at least one catalytic curing agent are present in a total amount of about 10 weight percent to about 50 weight percent of the polymer composition, and are present in a weight-to-weight ratio of about 19:1 to about 1:1. Further, the polymer may have a notched Izod impact strength according to ASTM D256 of about 150 Joules/meter to about 1200 Joules/meter.

In another embodiment, a disposable food utensil may be made from a polymer composition of at least one biodegradable polyester present in about 50 weight percent to about 90 weight percent of the polymer composition, at least one biodegradable elastomer with cross-linked epoxy functional groups, and at least one catalytic curing agent, wherein the at least one biodegradable elastomer and the at least one catalytic curing agent are present in a total amount of about 10 weight percent to about 50 weight percent of the polymer composition, and are present in a weight to weight ratio of about 19:1 to about 1:1.

DETAILED DESCRIPTION

This disclosure is not limited to the particular systems, devices and methods described, as these may vary. The terminology used in the description is for the purpose of describing the particular versions or embodiments only, and is not intended to limit the scope.

Biodegradable polymers have become a promising alternative to petroleum-based polymers because of certain properties, such as high strength, stiffness, excellent transparency and environmental compatibility. Unfortunately, the inherent brittleness of these biodegradable polymers is a major obstacle preventing the use of such polymers in diverse fields.

The term "biodegradable" as used within the scope of the present application refers to the fact that the polyesters decompose under environmental influences in an appropriate and demonstrable timespan. The degradation of the polymer may be partial or complete, leading to monomeric species or molecules. This degradation may take place due to hydrolysis and/or oxidation, and also due to the action of microorganisms such as bacteria, yeasts, fungi and algae. In addition, enzymatic degradation is also possible.

The present disclosure identifies biodegradable polymer blends with high impact strength and tensile properties. In some embodiments, a polymer composition may have the following components: at least one biodegradable polyester present in about 50 weight percent to about 90 weight percent of the polymer composition, at least one biodegradable elastomer with cross-linked epoxy functional groups, and at least one catalytic curing agent. The biodegradable elastomer and the catalytic curing agent are present in a total amount of about 10 weight percent to about 50 weight percent of the polymer composition, and are present in a weight to weight ratio of about 19:1 to about 1:1.

In some embodiments, the biodegradable polyester may be a polymer or a copolymer of an aliphatic carboxylic acid, a polymer or a copolymer of an ester derivative of an aliphatic carboxylic acid, a polymer or a copolymer of a cycloaliphatic dicarboxylic acid, a polymer or a copolymer of an ester derivative of a cycloaliphatic dicarboxylic acid, a polymer or a copolymer of a hydroxyalkanoate, or any combination thereof.

Non-limiting examples of an aliphatic carboxylic acid polymer include polymers of lactic acid, malonic acid, succinic acid, glutaric acid, adipic acid, pimelic acid, azelaic acid, sebacic acid, fumaric acid, 2,2-dimethylglutaric acid, suberic acid, diglycolic acid, itaconic acid, maleic acid, and combinations thereof. These carboxylic acids may be linear or branched.

Some examples of cycloaliphatic dicarboxylic acid polymers may include, but are not limited to, polymers of 1,3-cyclopentanedicarboxylic acid, 1,4-cyclohexane-dicarboxylic acid, 1,3-cyclo hexanedicarboxylic acid, 2,5-norbornane dicarboxylic acid, and combinations thereof.

Ester-forming derivatives of the aliphatic or cycloaliphatic dicarboxylic acids described herein may include di-$C_1$-$C_6$-alkyl esters, such as dimethyl, diethyl, di-n-propyl, diisopropyl, di-n-butyl, di-isobutyl, di-t-butyl, di-n-pentyl, diisopentyl or di-n-hexyl esters. It is likewise possible to employ anhydrides of the dicarboxylic acids.

Some polyhydroxyalkanoates that may be used include polymers of 3-hydroxybutyrate, 4-hydroxybutyrate, 3-hydroxybutyrate-co-3-hydroxyvalerate, 3-hydroxydodecanoate, 3-hydroxyoctanoate, 3-hydroxytetradecenoate, and combinations thereof.

In some embodiments, the biodegradable polyester may be present in about 50 weight percent to about 90 weight percent, in about 50 weight percent to about 80 weight percent, in about 50 weight percent to about 70 weight percent, or in about 50 weight percent to about 60 weight percent of the total polymer composition. Specific examples include about 50 weight percent, about 65 weight percent, about 75 weight percent, about 85 weight percent, or about 90 weight percent of the total polymer composition, and ranges between any two of these values.

In some embodiments, impact modifiers such as epoxy-functionalized biodegradable elastomers may be mixed with the biodegradable polyesters described herein, to obtain the desired mechanical properties. Suitable biodegradable elastomers that may be used in some embodiments include poly(glycerol sebacate), poly(diol citrate), poly(r-caprolactone-co-DL-lactide), poly(tri-methylene carbonate-co-ϵ-caprolactone), poly(tri-methylene carbonate-co-DL-lactide), poly(butylene adipate-co-terephthalate) (PBAT), medium chain polyhydroxy-alkanoates, and combinations thereof.

Figure 1:
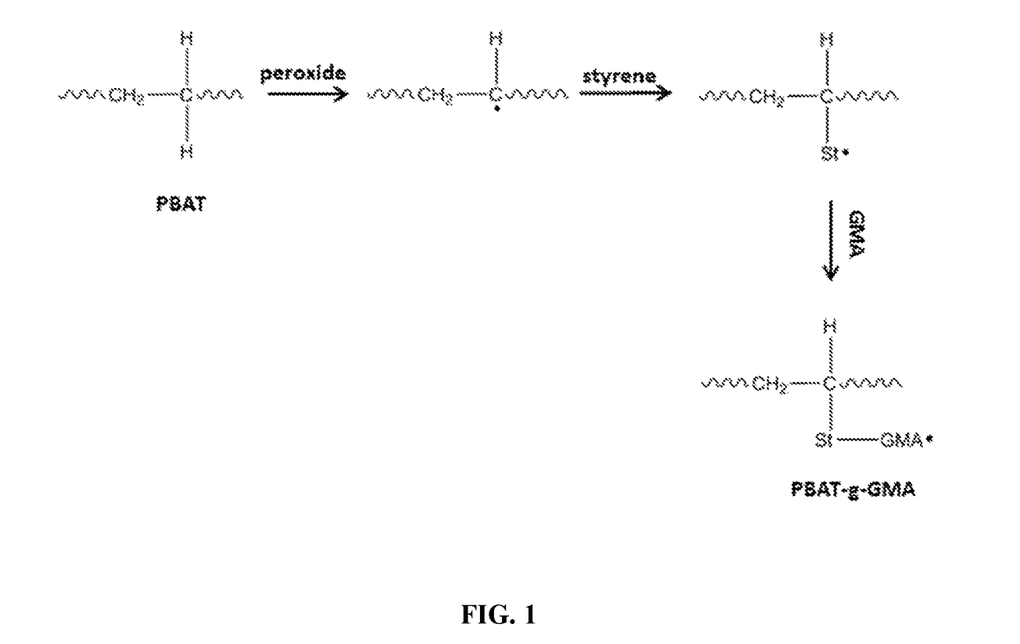
FIG. 1 shows a schematic representation of styrene assisted grafting of epoxy containing monomer onto an elastomer according to an embodiment.

Some of the biodegradable elastomers described herein may not have functional groups, such as epoxy groups and carboxyl groups, which are involved in cross-linking. The degree of cross-linking may determine the mechanical properties of the polymer. The biodegradable elastomers may be epoxy-functionalized by melt-grafting unsaturated monomers bearing epoxy groups onto elastomers via reactive extrusion, blending or by any means known to one of ordinary skill in the art. For example, the grafting reaction may take place according to known processes in which the biodegradable elastomer, the unsaturated monomer bearing epoxy groups or its derivative, and a radical former such as, for example, a peroxide, are mixed and the mixture is extruded. In some embodiments, styrene may also be included in the mixture to aid the process of grafting. Examples of unsaturated monomers that may be used include glycidyl methacrylate (GMA), glycidyl acrylate, glycidyl-2-ethyl acrylate, glycidyl-2-propyl acrylate, monoglycidyl itaconate, monoglycidyl butenetricarboxylate, diglycidyl butenetricarboxylate, glycidyl esters of maleic acid, glycidyl esters of crotonic acid, and glycidyl esters of fumaric acid. During the grafting reaction, the ratio of the monomer bearing epoxy groups with respect to the biodegradable elastomer may be from about 0.01 weight percent to about 10 weight percent, from about 0.05 weight percent to about 10 weight percent, from about 0.1 weight percent to about 10 weight percent, from about 1 weight percent to about 10 weight percent, or from about 5 weight percent to about 10 weight percent. Specific examples include about 0.01:10, about 0.02:10, about 0.05:10, about 0.1:10, about 1:10, about 5:10 and ranges between any two of these values. Any known melt mixer in the art, such as a single or twin-screw extruder, blender, kneader, internal mixer, or roll mixer may be used in this step. A schematic representation of styrene assisted grafting of GMA onto PBAT is shown in FIG. 1.

Figure 2:
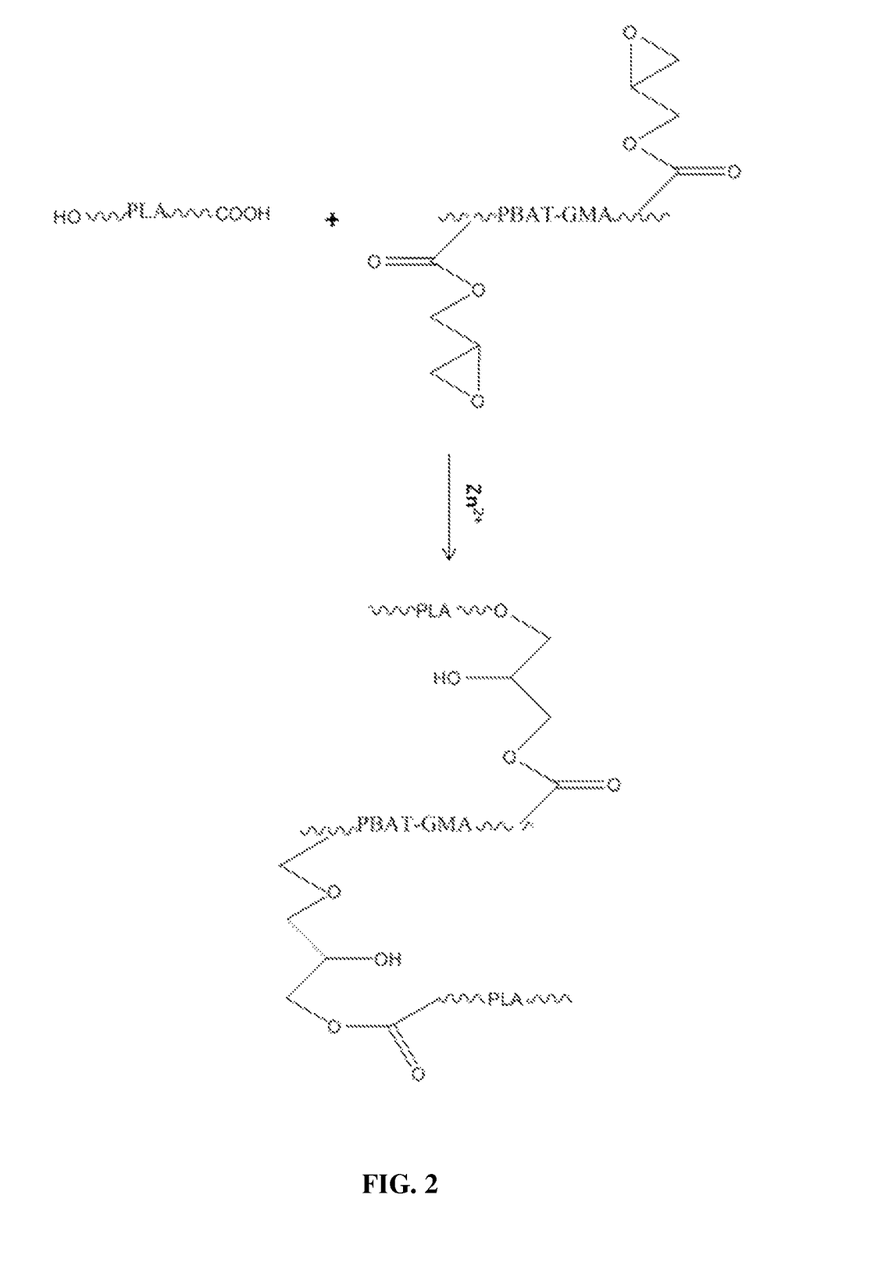
FIG. 2 depicts a cross-linking reaction between a biodegradable polyester and an elastomer catalyzed by a curing agent according to an embodiment.

The biodegradable polymer blends of the current disclosure may also include catalytic curing agents. These curing agents may help in cross-linking the epoxy groups of elastomers. Further, they may also help in cross-linking the epoxy groups of the elastomers with the hydroxyl groups of the biodegradable polyesters described herein. These cross-linking reactions may increase the interfacial compatibilization between the polyester and the elastomer. A schematic representation of the cross-linking reaction catalyzed by a curing agent is depicted in FIG. 2. Further, the extent of cross-linking may determine or influence the mechanical properties of the polymer. Non-limiting curing agents that may be used include ionomeric elastomers, acid anhydride polymers, imidazole derivatives, divalent metal oxides, and combinations thereof. An exemplary ionomeric elastomer may be poly(butylene adipate-co-terephthalate) (PBAT) zinc ionomer. This zinc ionomer may be prepared by neutralizing the carboxylated-PBAT with zinc oxide in a twin screw extruder. PBAT with carboxyl groups may be obtained by melt grafting unsaturated monomers with carboxylic groups, such as methacrylic acid onto PBAT.

During the preparation of ionomers, different amounts of zinc oxide may be included in the reaction, and the molar ratio between the carboxylated-elastomer and zinc oxide may be from about 1:0.1 to about 1:0.5, from about 1:0.1 to about 1:0.25, or from about 1:0.1 to about 1:0.2. Specific examples include about 1:0.1, about 1:0.2, about 1:0.3, or about 1:0.5, and ranges between any two of these values. In addition, other metal oxides, such as magnesium oxide, lithium oxide, calcium oxide, sodium oxide and the like may be substituted for zinc oxide. In some embodiments, the curing agent may contain transition metal ions. In some embodiments, the ionomers may also be prepared by neutralizing the carboxylated-elastomer with metal acetates, such as zinc acetate, sodium acetate, calcium acetate and the like.

The ratio of the biodegradable elastomer to the curing agent may play a role in determining the impact strength and toughness of the polymer. The epoxy-functionalized biodegradable elastomer and the catalytic curing agent may be present in the polymer blends in a weight to weight ratio of about 19:1 to about 1:1, about 15:1 to about 1:1, about 10:1 to about 1:1, or about 5:1 to about 1:1. Specific examples include about 19:1, about 15:1, about 12:1, about 10:1, about 5:1, about 2:1, about 1:1, and ranges between any two of these values. Further, the biodegradable elastomer and the catalytic curing agent may be present in the polymer composition in a total amount from about 10 weight percent to about 50 weight percent, from about 20 weight percent to about 50 weight percent, from about 30 weight percent to about 50 weight percent, or from about 40 weight percent to about 50 weight percent. Specific examples include about 10 weight percent, about 25 weight percent, about 35 weight percent, about 40 weight percent, about 50 weight percent, and ranges between any two of these values.

The biodegradable polymer blends of the present disclosure may be prepared by melt blending or melt compounding the individual components using any screw type compounding extruder known in the art, such as Leistritz twin screw extruder and Brabender twin extruder. An exemplary process for producing the biodegradable polymer blends may include performing the following operations in one pass through the extruder: grafting the epoxy functional groups on to the biodegradable elastomer, and melt compounding the grafted biodegradable elastomer (without prior isolation) in the second section of the extruder together with the biodegradable polyester and the curing agent which are supplied through a lateral extruder, with additives possibly being added at a suitable location.

Another process for producing the polymer blends according to the present disclosure may be a multi-step, discontinuous process. In the first step, the biodegradable elastomer is grafted with epoxy groups in a melt extrusion process, then granulated and dried. In some embodiments, the biodegradable elastomers with epoxy groups may be obtained commercially. In the second step, this granulate is mixed with a granulate of the polyester and the curing agent, with the desired additives possibly being added as well at this point. In a last step, the mixture may be compounded by extrusion with subsequent granulation and drying. This melt blending process may be performed by any screw-type compounding extruder.

Polymer blends with varying impact strength and the toughness may be obtained by varying the reactive blending temperature during the manufacturing process. Suitable temperatures to perform such reactive blending may be from about 150° C. to about 250° C., from about 175° C. to about 250° C., from about 200° C. to about 250° C., or from about 225° C. to about 250° C. Specific examples include about 150° C., about 170° C., about 200° C., about 220° C., about 240° C., about 250° C., and ranges between any two of these values.

The impact strength and the toughness of the polymer blend may also depend on the ratio of the epoxy-functionalized biodegradable elastomer and the curing agent used in the blending. In addition, the type of the ionomer catalytic agent used may also influence the physical properties of the polymer blends. For example, the polymer blend with zinc ionomers may exhibit different impact strength and toughness when compared to blends with lithium ionomers.

The biodegradable polymer blends of this disclosure may have an Izod impact strength according to ASTM D256 of about 150 Joules/meter to about 1200 Joules/meter, of about 350 Joules/meter to about 1200 Joules/meter, of about 550 Joules/meter to about 1200 Joules/meter, of about 750 Joules/meter to about 1200 Joules/meter or of about 1000 Joules/meter to about 1200 Joules/meter. Specific examples include about 150 Joules/meter, about 300 Joules/meter, about 500 Joules/meter, about 750 Joules/meter, about 1000 Joules/meter, about 1200 Joules/meter, and ranges between any two of these values.

In some embodiments, the biodegradable polymer blends may have the tensile strength of about 35 MPa to about 50 MPa, of about 40 MPa to about 50 MPa, or of about 45 MPa to about 50 MPa. Specific examples include about 35 MPa, about 40 MPa, about 45 MPa, about 50 MPa, and ranges between any two of these values. The polymers may display these mechanical properties when the tensile tests are carried at an extension rate of 5 centimeters/minute.

The polymers of the current disclosure may have an average particle diameter of about 0.5 microns to about 2 microns, of about 1 micron to about 2 microns, or of about 1.5 microns to about 2 microns. Specific examples include about 0.5 microns, about 0.75 microns, about 1 micron, about 1.25 microns, about 1.5 microns, about 2 microns, and ranges between any two of these values.

Generally, polymer blends may be classified as either miscible (single-phase) or immiscible (multi-phase). Many combinations of polymers are immiscible. The formation of a dispersed phase in a continuous phase and phase separation (e.g., upon changing temperatures) are common occurrences. Blend morphology may thus be a dynamic phenomenon, especially during processing. The introduction of compatibilizers is one method of stabilizing and improving the internal structure or morphology of the blend. Such substances may alter the interfacial tension of blend phases or work via mechanisms, such as the formation of an interpenetrating polymer network (IPN) to improve adhesion between phases. To overcome the immiscibility of biodegradable polyesters with the elastomers that are used, compatibilizers may be added. In some embodiments, suitable block or graft copolymers that are either pre-made or in-situ formed may be used during the melt blending process.

The biodegradable polymer blends may contain other additives and fillers in their composition. Examples of suitable fillers are carbon black, starch, lignin powder, cellulose fibers, natural fibers, such as sisal and hemp, iron oxides, clay minerals, talc, ores, calcium carbonate, calcium sulfate, barium sulfate and titanium dioxide. The additives may also, in some cases, contain stabilizers such as tocopherol (vitamin E), organic phosphorus compounds, mono-, di- and polyphenols, hydroquinones, diarylamines, thioethers, UV stabilizers, nucleating agents such as talc, lubricants and mold release agents based on hydrocarbons, fatty alcohols, higher carboxylic acids, metal salts of higher carboxylic acids, such as calcium and zinc stearates, and montan waxes. The biodegradable polymer blends according to the disclosure may additionally be colored as desired by adding organic or inorganic dyes. The dyes may also be regarded as additives in the widest sense.

The biodegradable polymer blends of the current disclosure may be used for a wide variety of applications, such as making a film, an article, a bag, a container, a wrapper, an automobile part, or a packaging material. Some exemplary objects made from such polymers may be articles used in health care such as personal hygiene articles (e.g., disposable diapers, incontinence protectors, panty liners, sanitary napkins, etc.), surgical drapes, hospital gowns, instrument pads, bandages, powders, towels, overwraps, head coverings, face masks, shoe coverings, sponges, dressings, tapes, underpads, liners, wash cloths, sheets, pillow covers, napkins, cloth-like outercovers, surgical products, wipes and wound care products.

The polymers of the current disclosure may also be used in making food service articles such as dishes, plates, bowls, cups, pitchers, utensils of all sizes, forks, knives, spoons, containers, including covered and uncovered containers, and the like.

Various embodiments of the compositions and materials of the present disclosure may be used in a variety of applications, including, but not limited to, absorbent garments, chewing gum (e.g., to deliver nutrients), inflatable balloons, fishing lures, fishing flies, disposable bags, edible films (e.g., films that protect the freshness of food product but that are biodegradable within the digestive tract), degradable films (alternative to saran wrap/cellophane), general packaging (e.g., degradable in composts or landfills), flavor and aroma barriers, degradable foams for packaging applications, degradable filters, hair products (e.g., as alternatives to existing wax products), agricultural seeding strips and tapes, cosmetics, preservation of materials (e.g., wood), agricultural mulch, packaging material for seeds, nutrients or flowers, substrate in adhesive films, handbags, bed films, bottles, boxes, dust bags, labels, cushion covers, handkerchiefs, toys, protective covers for various articles, fibers, coatings, and beads.

The disclosed biodegradable polymer blends may be used in a variety of medical applications, including, but not limited to, bioactive agent delivery vehicles (e.g., delivery of antibiotics, drugs, etc.), patches for diabetic ulcers, abdominal implants to prevent adhesions, biodegradable adhesives, in vivo and in vitro sensors, catheters, surgical glue, cardiac, bile-duct, and intestinal stents, microfabrication applications (e.g., capillary networks), degradable O-rings, septums, and the like. The polymers may also be used as long-term circulating particles for applications including targeted drug delivery, blood substitutes, and/or the like. The polymers may also be used for injectable drug delivery systems for mechanically taxing environments (e.g., within joints) where, for example, the material can be configured to release drugs in a controlled manner without being compromised by a dynamic or static external environment.

EXAMPLES

Example 1

Preparation of Epoxy-Functionalized PBAT (PBAT-g-GMA)

Prior to extrusion, poly(butylene adipate-co-terephthalate) (PBAT) pellets are oven dried for 1 day between 75° C. and 100° C. Dried PBAT pellets, glycidyl methacrylate (GMA) and styrene are mixed in a weight to weight ratio of 100:5:1 in a plastic bag along with a small amount of dicumyl peroxide. The mixture is extruded through a twin screw extruder and the temperature profile of the extruder barrel is changed gradually (180° C./190° C./190° C./200° C./200° C./200° C./190° C./180° C.) from the first heating zone (next to feeding throat) to die, respectively. The screw speed of the extruder is set at 50 rpm. Vacuum venting at the seventh zone of the extruder is applied to eliminate small molecules generated during neutralization. The extrudates are pelletized and then extruded for a second time under the same conditions in order to ensure a more thorough and uniform neutralization reaction.

Example 2

Preparation of Carboxylated PBAT

Prior to extrusion, poly(butylene adipate-co-terephthalate) (PBAT) pellets are oven dried for 1 day between 75° C. and 100° C. Dried PBAT pellets, methacrylic acid (MAA) and styrene are mixed in a weight to weight ratio of 100:5:2 in a plastic bag along with a small amount of dicumyl peroxide. The mixture is extruded through a twin screw extruder and the temperature profile of the extruder barrel is changed gradually (180° C./190° C./190° C./200° C./200° C./200° C./190° C./180° C.) from the first heating zone (next to feeding throat) to die, respectively. The screw speed of the extruder is set at 50 rpm. Vacuum venting at the seventh zone of the extruder is applied to eliminate small molecules generated during neutralization. The extrudates are pelletized and then extruded for a second time under the same conditions in order to ensure a more thorough and uniform neutralization reaction.

Example 3

Preparation of PBAT-Zn Ionomer

PBAT-Zn ionomer is prepared by neutralizing the carboxylated-PBAT of Example 2 with ZnO in a co-rotating twin screw extruder (such as the ZSE-18 twin screw extruder from Leistritz Corporation of Allendale, N.J.) with a screw diameter of 17.8 millimeters and an L/D ratio of 40. Prior to extrusion, carboxylated-PBAT pellets and zinc oxide are oven dried for at least 1 day between 75° C. and 100° C. Dried ZnO powder and carboxylated-PBAT pellets are mixed in a weight to weight ratio of 1:22.5 in a plastic bag. The mixture is extruded through a twin screw extruder and the temperature profile of the extruder barrel is changed gradually (180° C./190° C./190° C./200° C./200° C./200° C./190° C./180° C.) from the first heating zone (next to feeding throat) to die, respectively. The screw speed of the extruder is set at 50 rpm. Vacuum venting at the seventh zone of the extruder is applied to eliminate small molecules generated during neutralization. The extrudates are pelletized and then extruded for a second time under the same conditions in order to ensure a more thorough and uniform neutralization reaction.

Example 4

Preparation of a Biodegradable Polymer Blend

Prior to melt compounding, pellets of polylactide, epoxy-functionalized PBAT (PBAT-g-GMA) and PBAT-Zn ionomer are dried for 1 day between 60° C. and 80° C. About 80% by weight of polylactide, 15% by weight of PBAT-g-GMA and 5% by weight of PBAT-Zn are melt blended in an extruder with a screw speed of 50 rpm. The temperature profile of the extruder is set at 210° C./220° C./230° C./240° C./240° C./240° C./230° C./220° C. from the first heating zone to die, respectively. The extrudates are pelletized and injection molded using, for example, a SE50D pelletizer and injection molder from Sumitomo Heavy Industries. Ltd. of Tokyo, Japan at a melt temperature of 190° C. and a mold temperature of 35° C.

Example 5

Preparation of a Biodegradable Polymer Blend

Prior to melt compounding, pellets of poly-4-hydroxybutyrate, epoxy-functionalized PBAT (PBAT-g-GMA) and PBAT-Zn ionomer are dried for 1 day between 60° C. and 80° C. About 80% by weight of poly-4-hydroxybutyrate, 15% by weight of PBAT-g-GMA and 5% by weight of PBAT-Zn are melt blended in an extruder with a screw speed of 50 rpm. The temperature profile of the extruder is set at 210° C./220° C./230° C./240° C./240° C./240° C./230° C./220° C. from the first heating zone to die, respectively. The extrudates are pelletized and injection molded using, for example, a SE50D pelletizer and injection molder from Sumitomo Heavy Industries. Ltd. of Tokyo, Japan at a melt temperature of 190° C. and a mold temperature of 35° C.

Example 6

Mechanical Tests

Notched Izod impact tests are performed according to ASTM D256 using a Plastic Impact Tester (Tinius Olsen). An average value of five tests is taken for each sample. Tensile tests are conducted on a universal testing machine (Instron 4466) following ASTM D638. The crosshead speed is set at 5 millimeter/min and 50 millimeter/min, respectively. The initial strain is measured using a 2-inch extensometer (Model: 3542-0200-010-ST; Epsilon Technology Co. of Jackson, Wyo.) The notched Izod impact strength of the polymer of Example 4 will be 1200 Joules/meter, and the tensile strength will be 40 MPa.

Example 7

A Food Utensil Made from a Biodegradable Polymer

The biodegradable polymer pellets of Example 4 are heated in an injection molding machine and fed into a mold cavity and allowed to cool. The cooled polymer obtains the shape according to the contour of the cavity, and utensils such as plates, cups and spoons may be manufactured using appropriate molds.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A polymer composition comprising:
   at least one biodegradable polyester present in about 50 weight percent to about 90 weight percent of the polymer composition;
   a biodegradable elastomer with cross-linked epoxy functional groups, wherein the biodegradable elastomer is poly(glycerol sebacate), poly(diol citrate), poly(r-caprolactone-co-D L-lactide), poly(tri-methylene carbonate-co-ε-caprolactone), poly(tri-methylene carbonate-co-D L-lactide), poly(butylene adipate-co-terephthalate), polyhydroxyalkanoates, or a combination thereof; and
   at least one catalytic curing agent,
   wherein the biodegradable elastomer and the at least one catalytic curing agent are present in a total amount of about 10 weight percent to about 50 weight percent of the polymer composition, and are present in a weight to weight ratio of about 19:1 to about 1:1.

2. The composition of claim 1, wherein the biodegradable polyester is a polymer of an aliphatic carboxylic acid, a polymer of an ester derivative of an aliphatic carboxylic acid, a polymer of a cycloaliphatic dicarboxylic acid, a polymer of an ester derivative of a cycloaliphatic dicarboxylic acid, a polymer of a hydroxyalkanoate, or a combination thereof.

3. The composition of claim 1, wherein the biodegradable polyester is a copolymer of an aliphatic dicarboxylic acid polymer, an aliphatic dicarboxylic acid ester polymer, a cycloaliphatic dicarboxylic acid polymer, a cycloaliphatic dicarboxylic acid ester polymer, a hydroxyalkanoate polymer, or a combination thereof.

4. The composition of claim 1, wherein the biodegradable polyester is a polymer of one or more of lactic acid, malonic acid, succinic acid, glutaric acid, adipic acid, pimelic acid, azelaic acid, sebacic acid, fumaric acid, 2,2-dimethylglutaric acid, suberic acid, diglycolic acid, itaconic acid, and maleic acid.

5. The composition of claim 1, wherein the biodegradable polyester is a polymer of one or more of 1,3-cyclopentanedicarboxylic acid, 1,4-cyclohexanedicarboxylic acid, 1,3-cyclo hexanedicarboxylic acid, and 2,5-norbornane dicarboxylic acid.

6. The composition of claim 1, wherein the biodegradable polyester is a polymer of one or more of 3-hydroxybutyrate, 4-hydroxybutyrate, 3-hydroxybutyrate-co-3-hydroxyvalerate, 3-hydroxydodecanoate, 3-hydroxyoctanoate, and 3-hydroxytetradecenoate.

7. The composition of claim 1, wherein the catalytic curing agent is an ionomer of the biodegradable elastomer, an acid anhydride polymer, a divalent metal oxide, or a combination thereof.

8. The composition of claim 1, wherein the at least one catalytic curing agent comprises an ionomer of the biodegradable elastomer, comprising transition metal ions.

9. The composition of claim 1, wherein the at least one biodegradable polyester is polylactide, the biodegradable elastomer is poly(butylene adipate-co-terephthalate) with cross-linked epoxy functional groups, and the at least one catalytic curing agent is a zinc ionomer of poly(butylene adipate-co-terephthalate), and wherein the biodegradable polyester, the biodegradable elastomer and the catalytic curing agent are present in a weight to weight ratio of 80:15:5.

10. A biodegradable polymer composition comprising:
at least one biodegradable polyester present in about 50 weight percent to about 90 weight percent of the polymer composition;
a biodegradable elastomer with cross-linked epoxy functional groups, wherein the biodegradable elastomer is poly(glycerol sebacate), poly(diol citrate), poly(r-caprolactone-co-D L-lactide), poly(tri-methylene carbonate-co-ϵ-caprolactone), poly(tri-methylene carbonate-co-D L-lactide), poly(butylene adipate-co-terephthalate), polyhydroxyalkanoates, or a combination thereof; and
at least one catalytic curing agent,
wherein the biodegradable elastomer and the at least one catalytic curing agent are present in a total amount of about 10 weight percent to about 50 weight percent of the polymer composition, and are present in a weight-to-weight ratio of about 19:1 to about 1:1, and wherein the biodegradable polymer composition has a notched Izod impact strength according to ASTM D256 of about 150 Joules/meter to about 1200 Joules/meter, a tensile strength of about 35 MPa to about 50 MPa, and an average particle diameter of about 0.5 microns to about 2 microns.

11. The biodegradable polymer composition of claim 10, wherein the at least one biodegradable polyester is polylactide, the biodegradable elastomer is poly(butylene adipate-co-terephthalate) with cross-linked epoxy functional groups, and the at least one catalytic curing agent is a zinc ionomer of poly(butylene adipate-co-terephthalate), and wherein the biodegradable polyester, the biodegradable elastomer and the catalytic curing agent are present in a weight to weight ratio of 80:15:5.

12. A method of making a biodegradable polymer, the method comprising:
melt blending a mixture of:
at least one biodegradable polyester present in about 50 weight percent to about 90 weight percent of the mixture;
a biodegradable elastomer with cross-linked epoxy functional groups, wherein the biodegradable elastomer is poly(glycerol sebacate), poly(diol citrate), poly(r-caprolactone-co-D L-lactide), poly(tri-methylene carbonate-co-ϵ-caprolactone), poly(tri-methylene carbonate-co-D L-lactide), poly(butylene adipate-co-terephthalate), polyhydroxyalkanoates, or a combination thereof; and
at least one catalytic curing agent,
wherein the biodegradable elastomer and the at least one catalytic curing agent are present in a total amount of about 10 weight percent to about 50 weight percent of the mixture, and are present in a weight-to-weight ratio of about 19:1 to about 1:1.

13. The method of claim 12, wherein the melt blending of the mixture comprises blending at a temperature of about 150° C. to about 250° C.

14. The method of claim 12, wherein the melt blending of the mixture comprises blending the biodegradable polyester selected from a polymer of an aliphatic carboxylic acid, a polymer of an ester derivative of an aliphatic dicarboxylic acid, a polymer of a cycloaliphatic dicarboxylic acid, a polymer of an ester derivative of a cycloaliphatic dicarboxylic acid, a polymer of a hydroxyalkanoate, or a combination thereof.

15. The method of claim 12, wherein the melt blending of the mixture comprises blending the catalytic curing agent selected from an ionomer of the biodegradable elastomer, an acid anhydride polymer, a divalent metal oxide, or a combination thereof.

16. A biodegradable polymer article made from a biodegradable polymer composition, the polymer composition comprising:
at least one biodegradable polyester present in about 50 weight percent to about 90 weight percent of the polymer composition;
a biodegradable elastomer with cross-linked epoxy functional groups, wherein the biodegradable elastomer is poly(glycerol sebacate), poly(diol citrate), poly(r-caprolactone-co-D L-lactide), poly(tri-methylene carbonate-co-ϵ-caprolactone), poly(tri-methylene carbonate-co-D L-lactide), poly(butylene adipate-co-terephthalate), polyhydroxyalkanoates, or a combination thereof; and
at least one catalytic curing agent,
wherein the biodegradable elastomer and the at least one catalytic curing agent are present in a total amount of about 10 weight percent to about 50 weight percent of the polymer composition, and are present in a weight-to-weight ratio of about 19:1 to about 1:1, and wherein the polymer composition has a notched Izod impact strength according to ASTM D256 of about 150 Joules/meter to about 1200 Joules/meter.

17. The biodegradable polymer article of claim 16, wherein the biodegradable polyester is a polymer of an aliphatic carboxylic acid, a polymer of an ester derivative of an aliphatic dicarboxylic acid, a polymer of a cycloaliphatic dicarboxylic acid, a polymer of an ester derivative of a cycloaliphatic dicarboxylic acid, a polymer of a hydroxyalkanoate, or a combination thereof.

18. The biodegradable polymer article of claim 16, wherein the catalytic curing agent is an ionomer of the biodegradable elastomer, an acid anhydride polymer, a divalent metal oxide, or a combination thereof.

19. A disposable food utensil made from a polymer composition, the polymer composition comprising:
at least one biodegradable polyester present in about 50 weight percent to about 90 weight percent of the polymer composition;
a biodegradable elastomer with cross-linked epoxy functional groups, wherein the biodegradable elastomer is poly(glycerol sebacate), poly(diol citrate), poly(r-caprolactone-co-D L-lactide), poly(tri-methylene carbonate-co-ϵ-caprolactone), poly(tri-methylene carbonate-co-D L-lactide), poly(butylene adipate-co-terephthalate), polyhydroxyalkanoates, or a combination thereof; and
at least one catalytic curing agent,
wherein the biodegradable elastomer and the at least one catalytic curing agent are present in a total amount of about 10 weight percent to about 50 weight percent of the polymer composition, and are present in a weight to weight ratio of about 19:1 to about 1:1.

20. The disposable food utensil of claim 19, wherein the biodegradable polyester is a polymer of an aliphatic carboxylic acid, a polymer of an ester derivative of an aliphatic dicarboxylic acid, a polymer of a cycloaliphatic dicarboxylic acid, a polymer of an ester derivative of a cycloaliphatic dicarboxylic acid, a polymer of a hydroxyalkanoate, or a combination thereof.

21. The disposable food utensil of claim 19, wherein the catalytic curing agent is an ionomer of the biodegradable elastomer, an acid anhydride polymer, a divalent metal oxide, or a combination thereof.

\* \* \* \* \*